Aug. 30, 1949.

R. E. TOBEY 2,480,617

REFRIGERATOR INCLUDING MEANS FOR CONTROLLING CIRCULATION OF AIR THEREIN

Filed Oct. 8, 1945

INVENTOR
RAYMOND E. TOBEY.
ATTORNEY

Aug. 30, 1949.　　　　　R. E. TOBEY　　　　　2,480,617
REFRIGERATOR INCLUDING MEANS FOR CONTROLLING
CIRCULATION OF AIR THEREIN
Filed Oct. 8, 1945　　　　　　　　　　　2 Sheets-Sheet 2
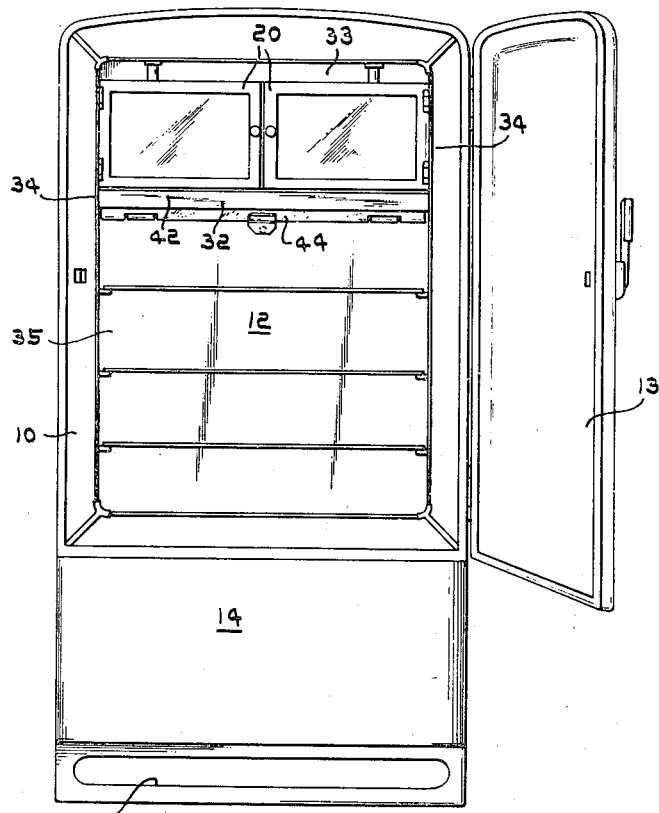
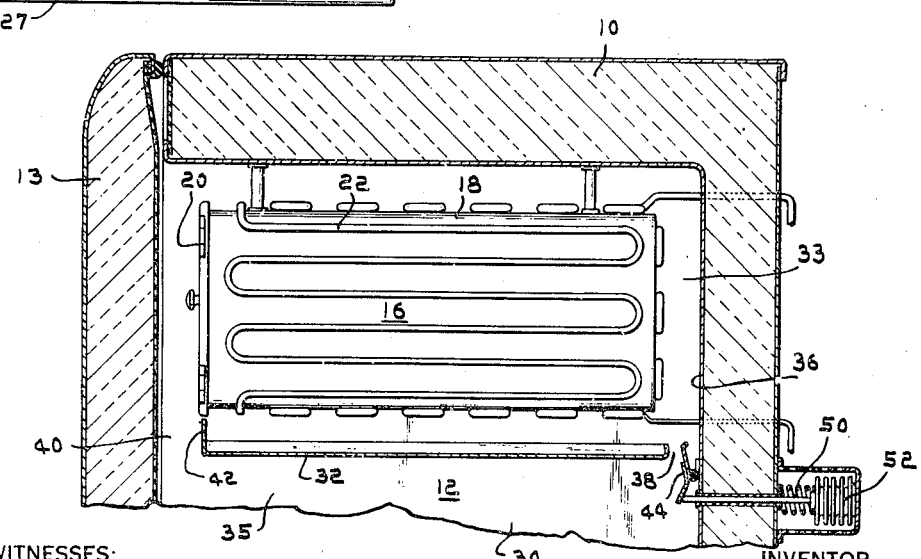
WITNESSES:　　　　　　　　　　　INVENTOR
　　　　　　　FIG. 3.　　　　RAYMOND E. TOBEY.
　　　　　　　　　　　　　　　　BY
　　　　　　　　　　　　　　　　　ATTORNEY Patented Aug. 30, 1949

2,480,617

UNITED STATES PATENT OFFICE 2,480,617

REFRIGERATOR, INCLUDING MEANS FOR CONTROLLING CIRCULATION OF AIR THEREIN

Raymond E. Tobey, Springfield, Mass., assignor to Westinghouse Electric Corporation, East Pittsburgh, Pa., a corporation of Pennsylvania Application October 8, 1945, Serial No. 621,058

4 Claims. (Cl. 62—2)

This invention relates to refrigeration apparatus and more especially to refrigerators having compartments maintained at different temperatures and cooled by one evaporator.

Refrigerators are known which have an upper food-storage compartment in which an evaporative cooling unit is located and a lower food-storage compartment separated from the upper compartment by a partition and cooled by a convectional air flow through openings in the partition between the two compartments. It is also known to provide a valve in the opening of the partition to control this convectional air flow to maintain the temperature of the lower compartment substantially constant and to control the valve by a thermostat responsive to the temperature of the lower compartment.

This arrangement has the disadvantage that if a simple thermostat is used, a large temperature variation occurs in the lower compartment before sufficient power is generated by the thermostat to actuate the valve. This temperature variation may be reduced by a delicate balancing of the valve, by use of an ultra-sensitive thermostat, and by utilizing outside power such as electricity to actuate the valve. However, all of these devices are costly and, in addition, merely reduce the temperature variation without completely eliminating it.

It is an object of this invention to provide a thermostatically-controlled valve in the above referred to refrigerator which holds the temperature of the lower compartment substantially constant.

Another object of the invention is to provide a valve in a partition of a refrigerator, which valve is controlled by a thermostat responsive to the ambient temperature of the refrigerator.

A further object of this invention is to provide a simple and rugged thermostatically-controlled valve system for controlling the air flow in a refrigerator.

These and other objects are effected by my invention as will be apparent from the following description and claims taken in connection with the accompanying drawings, forming a part of this application, in which:

Fig. 2 is a front elevation of the refrigerator; and

Fig. 3 is a sectional view of a portion of a refrigerator embodying a modification of the invention.

Figure 1:
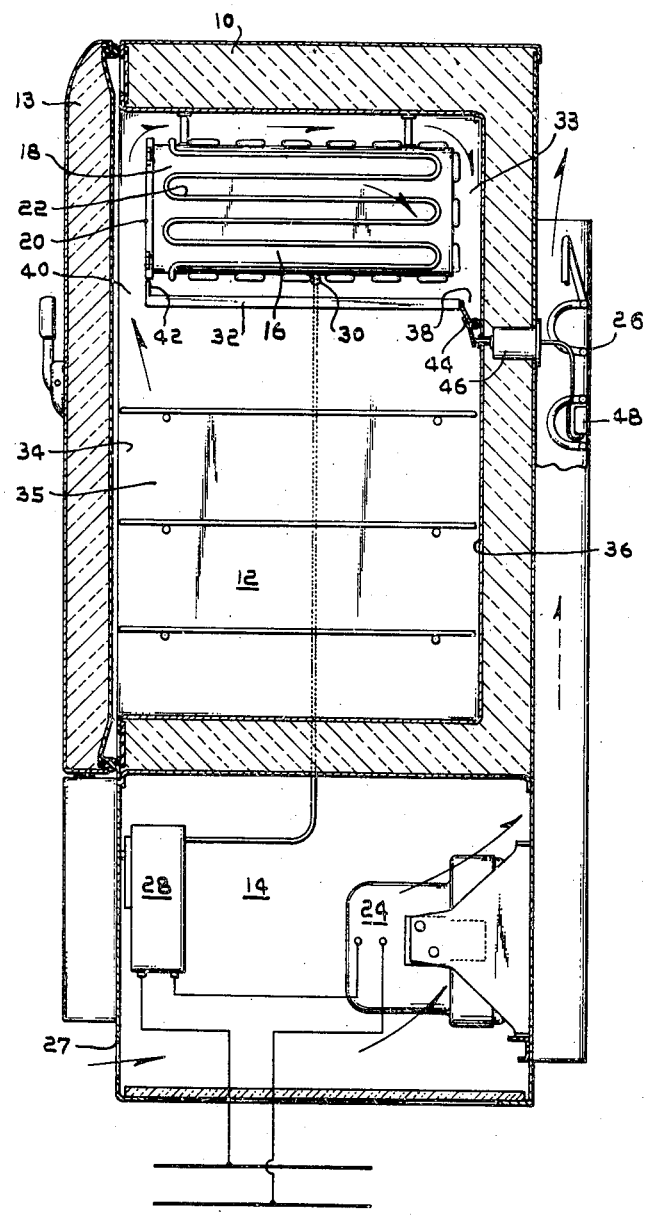
Fig. 1 is a sectional view of a refrigerator embodying the invention.

Referring to the drawing, the reference numeral 10 designates a refrigerator cabinet comprising an insulated food chamber 12 in the upper portion and a machine compartment 14 in the lower portion. A cooling unit 16 of the evaporative type is located in the upper portion of the food chamber 12 but is spaced from the upper and the side walls of the refrigerator cabinet 10. The cooling unit 16 comprises a rectangular metal container 18 for frozen food, the container having an open front closed by a door 20 which is spaced from the main door 13 of the refrigerator. The door 20 is formed of material of low heat conductivity. A convoluted tube 22 is soldered to the outside of the container 18 and contains a volatile refrigerant supplied by the refrigerating mechanism 24 in the machine compartment 14.

The refrigerating mechanism 24, which is of the well-known mechanical compression type, includes a condenser 26 which is cooled by a convectional flow of air taken from the room in which the refrigerator is located. The air enters through an opening 27 at the front of the machine compartment 14 and is drawn upwardly by the chimney effect created by the warm condenser 26. The outer face of the condenser 26 is also cooled by the room air.

The refrigerating mechanism 24 includes a compressor driven by an electric motor (not shown) which is controlled by a thermostat 28 comprising a thermostatic bulb 30 located in heat exchange relationship with the cooling unit 16. The thermostat 28 causes the cooling unit 16 to be maintained within predetermined limits of temperature.

A partition 32 of low heat conductivity is located a short distance below the cooling unit 16 and divides the food chamber 12 into an upper compartment 33 and a lower compartment 35. The partition 32 extends to the side walls 34 of the refrigerator but is spaced from the rear wall 36 thereof and from the door 13 to provide air passages 38 and 40, respectively. The forward edge of the partition 32 carries an extension 42 which terminates adjacent the lower edge of the door 20.

The cold air adjacent the cooling unit 16 tends to flow downwardly through the air passage 38 at the rear of the partition 32 and this air is replaced by air from the lower compartment 35, which air flows upwardly through the air passage 40 between the door 20 of the cooling unit 16 and the door 13 of the food chamber. This circulation of air, together with the small heat leakage through the partition 32, cools the lower compartment 35 to a temperature of about 40° F. When the refrigerator is operating in a warm room, a more active circulation of air over the cooling unit 16 and through the lower compartment 35 is needed to cool this compartment than if the refrigerator is operating in a relatively cool room. This is due to the greater heat leakage into the lower compartment 35 in a warm room than in a cool room.

A valve 44, accordingly, is located in the air passage 38 to control the flow of air therethrough. The valve 44 is actuated by a thermostat 46 which includes a temperature-sensitive bulb 48 located in heat exchange relationship with the condenser 26. The thermostat opens the valve 44 farther when the temperature of the condenser 26 increases and moves the valve 44 towards the closed position when the temperature of the condenser 24 decreases. The condenser 26 is considerably warmer when the refrigerator is operating in a warm room than when it is operating in a cool room. This is caused not only by the difference in temperature between the air of the warm and the cool room by means of which the condenser 26 is cooled, but also by the fact that the refrigerating apparatus 24 operates for longer periods of time in the warm room than in the cool room to remove the additional heat which leaks into the cabinet in the warm room. Because of the large temperature variation to which the thermostat 46 is subjected, it will have ample power to operate the valve 44 and may be adjusted to keep the temperature of the lower compartment 35 constant.

A modification of the invention is shown in Fig. 3. In this modification, like parts are designated by the same reference numeral as in the previously-described modification. In this modification a thermostat 50 comprises a temperature-responsive Sylphon bellows 52 located in heat exchange relationship only with the ambient air of the refrigerator. The thermostat increases and decreases the opening of the valve 44 in response to increases and decreases, respectively, of the room air to control the temperature of the lower compartment 35. The room air varies through a wider range of temperature than is permissible in the food storage chamber 12, so that in this modification also a wide temperature variation is available to actuate the thermostatic valve.

It will be apparent from the above that this invention provides means for controlling the temperature of a food-storage compartment which is cooled by a cooling unit held at a substantially constant temperature, the means being responsive to the ambient temperature of the refrigerator.

While I have shown my invention in several forms, it will be obvious to those skilled in the art that it is not so limited, but is susceptible of various other changes and modifications without departing from the spirit thereof.

What is claimed is:

1. In a refrigerator including an insulated chamber, a partition in said chamber defining an upper and a lower food storage compartment, said partition including a valve, an evaporator in the upper compartment, refrigeration condensing and circulating apparatus for supplying liquid refrigerant to said evaporator and withdrawing refrigerant vapor therefrom, said apparatus having a portion which rises in temperature in response to the heat load on said evaporator and also in response to the temperature ambient the insulated compartment when said apparatus is operating, the combination with said refrigerator of a thermostat responsive to the temperature of said portion and operatively connected to said valve to increase the opening thereof when the temperature of said portion rises and to decrease said opening when the temperature of said portion falls.

2. In a refrigerator including an insulated chamber, a partition therein dividing the same into an upper and a lower food storage compartment, said partition including a valve, an evaporator in the upper compartment, refrigeration apparatus for supplying liquid refrigerant to said evaporator and withdrawing refrigerant vapor therefrom, said apparatus including a refrigerant condenser cooled by the air ambient the refrigerator, the combination with said refrigerator of a thermostat responsive to the temperature of said condenser and operatively connected to said valve to increase the opening thereof when the temperature of the condenser increases and to decrease said opening when the temperature of the condenser decreases.

3. A refrigerator comprising an insulated chamber having top, side, rear, and bottom walls, and a door defining at least a part of the front wall of said chamber, a partition in said chamber dividing it into an upper and a lower compartment, a cooling element of a mechanical refrigerator unit in said upper compartment, said chamber having a first and a second air passage, each of said air passages connecting said upper and said lower compartments to provide circulation of air between the cooling element and the lower compartment, said first passage being located near said door and said second passage being located to the rear of said first passage, a valve controlling the flow of air through said second passage, and a thermostat responsive to the ambient temperature of said refrigerator, said thermostat being operatively connected to said valve to increase the opening thereof when said temperature increases and to decrease said opening when said temperature decreases.

4. In a refrigerator including an insulated chamber having top, side, rear, and bottom walls and a door defining the front wall thereof, a horizontal partition in said chamber dividing it into an upper and a lower compartment, said partition being spaced from the rear wall and the front wall of the chamber and extending to the side walls thereof, a cooling element of a mechanical cooling unit in said upper compartment and spaced from said partition, said cooling element comprising top, side, and rear walls spaced from the respective top, side, and rear walls of said chamber, a door for said cooling unit spaced from the door of said chamber, an extension at the front edge of said partition, said extension having an upper edge lying adjacent to the lower edge of the door of the cooling unit, whereby an air circulating duct between the upper compartment and the lower compartment is established, which duct includes the space between said two doors, the spaces between the cooling unit and the top, side, and rear walls of said chamber and the space between the rear edge of the partition and the rear wall of said chamber, means for maintaining said cooling unit at a substantially constant temperature, and a valve adapted to close the space between the rear edge of the partition and the rear wall of said chamber, the combination with said refrigerator of means responsive to an element which increases and decreases in temperature at least in part in response to the increase and decrease, respectively, in the ambient temperature of the refrigerator to increase the opening of said valve when said ambient temperature increases and to decrease the opening of said valve when said ambient temperature decreases.

RAYMOND E. TOBEY.

REFERENCES CITED

The following references are of record in the file of this patent:

UNITED STATES PATENTS

| Number | Name | Date |
|---|---|---|
| 962,704 | Emerson et al. | June 28, 1910 |
| 2,240,882 | Brain | May 6, 1941 |
| 2,346,287 | Borgerd et al. | Apr. 11, 1944 |
| 2,433,187 | Alsing | Dec. 23, 1947 |